United States Patent
Zachäus

(10) Patent No.: US 12,139,272 B2
(45) Date of Patent: Nov. 12, 2024

(54) TAMPER DETECTION SYSTEM FOR RE-SEALABLE STORAGE CONTAINERS

(71) Applicant: KID-Systeme GmbH, Buxtehude (DE)

(72) Inventor: Matthias Zachäus, Buxtehude (DE)

(73) Assignee: KID-Systeme GmbH, Buxtehude (DE)

( * ) Notice: Subject to any disclaimer, the term of this patent is extended or adjusted under 35 U.S.C. 154(b) by 53 days.

(21) Appl. No.: 17/942,980

(22) Filed: Sep. 12, 2022

(65) Prior Publication Data

US 2023/0081750 A1   Mar. 16, 2023

(30) Foreign Application Priority Data

Sep. 13, 2021 (EP) ..................... 21196389
May 31, 2022 (DE) .............. 102022205477.6

(51) Int. Cl.
*B64D 45/00* (2006.01)
*B64D 11/06* (2006.01)

(52) U.S. Cl.
CPC ...... *B64D 45/0015* (2013.01); *B64D 11/0631* (2014.12)

(58) Field of Classification Search
CPC ............ B64D 45/0015; B64D 11/0631; G09F 3/0341; G09F 3/0329
See application file for complete search history.

(56) References Cited

U.S. PATENT DOCUMENTS

| | | | |
|---|---|---|---|
| 10,262,319 B1 | 4/2019 | Benkreira et al. | |
| 2008/0106127 A1* | 5/2008 | Hough | B64D 11/0629 297/188.08 |
| 2009/0189763 A1* | 7/2009 | Brinkley | G08B 13/126 340/541 |

(Continued)

FOREIGN PATENT DOCUMENTS

| | | |
|---|---|---|
| CN | 200965711 | 10/2007 |
| EP | 2 372 677 B1 | 10/2011 |
| WO | 2019/036304 | 2/2019 |

OTHER PUBLICATIONS

Bretz et al, Force Measurement of Hands and Fingers, Apr. 2010, Magyar Biomechanickal Konferencia-A-=0600, Biomechanica Hungarica III. vol. 1, p. 62. (Year: 2010).*

(Continued)

*Primary Examiner* — Joseph H Feild
*Assistant Examiner* — Cal J Eustaquio
(74) *Attorney, Agent, or Firm* — Nixon & Vanderhye P.C.

(57) ABSTRACT

A tamper detection system for a life vest storage container (10) on board a passenger aircraft (A), includes a receptacle (4) having an access opening with a closable lid (7); a first electrically conductive monitoring pad (1) formed on the closable lid (7); a second electrically conductive monitoring pad (2) formed on the receptacle (4); a non-conductive sealing member (3) including conductive patches of adhesive on the bottom side of two opposite edges of the sealing member and a conductive element leading between the two patches, the two patches applied to electrically conductive monitoring pads (1, 2); and a monitoring system (5) electrically coupled to the monitoring pads (1, 2) and configured to measure an electrical parameter associated with the electrically conductive path (C1, C2, CS) formed by the monitoring pads (1, 2) and the electrically conductive element within the sealing member (3).

14 Claims, 1 Drawing Sheet

(56) References Cited

U.S. PATENT DOCUMENTS

2009/0309722 A1   12/2009  Nichols et al.
2009/0315317 A1*  12/2009  Anderson ................ G09F 3/10
                                                                         283/81
2013/0187630 A1    7/2013  Beinhocker

OTHER PUBLICATIONS

Search Report issued in DE 10 2022 205 477.6 mailed Jan. 10, 2023, 12 pages.

* cited by examiner

TAMPER DETECTION SYSTEM FOR RE-SEALABLE STORAGE CONTAINERS

RELATED APPLICATION

This application incorporates by reference and claims priority to European Patent Application EP 21196389.7, filed Sep. 13, 2021, and to German Patent Application DE 102022205477.6, filed May 31, 2022.

TECHNICAL FIELD OF THE INVENTION

The invention relates to a tamper detection system for re-sealable storage containers, particularly for life vest storage containers on board of an aircraft. Moreover, the invention relates to a method of detecting a tamper event at a re-sealable storage container such as a life vest storage container on board of an aircraft.

TECHNICAL BACKGROUND

For reasons of safety, cabin crews on board of passenger aircraft need to check that all life jackets are present and ready for use before take-off. Life jackets are stowed away in receptacles such as containers or bags having exactly one opening through which the life jacket may be taken out or placed inside. Once the life jacket is placed in the receptacle, the container opening is secured with a seal. Those seals are visually inspected by the cabin crew. If the seal is broken, the life jacket needs to be checked and replaced, if necessary.

Document US 2009/0309722 A1 discloses a monetary package capable of detecting and communicating tampering including a container having a volume configured to hold monetary items such as currency, checks, and negotiable instruments, a sensor configured to detect an opening of the container, a device coupled to the sensor and configured to store data responsive to the sensor detecting the opening of the container, and a transmitter configured to wirelessly send the stored data.

US 2013/0187630 A1 discloses a sensor in form of an elongated flexible tape having a signal path made from electrical wire or optical fibers extending between one end and another end of the tape. The sensor tape may be used to detect an intrusion into, or out of, a protected volumetric space by enclosing the volume of interest with the sensor tape.

CN 200965711 Y discloses an electrically operated life jacket burglar alarm. The life jacket burglar alarm is put in place below a civil aviation airliner seat below so that, when someone takes the life vest without permission, an insulating card is taken out from a plastic casing together with the life vest outer packing bag is fixed, two control electrodes contact each other, trigger the work of warning circuit in the plastic casing, and drive bee calling organ sends the chimes of doom.

It is desirable to alleviate the checking process to be performed by the cabin crew, thereby decreasing turn-around time, i.e. the time needed between two flights.

SUMMARY OF THE INVENTION

The invention may be embodied to provide tamper or manipulation detection systems for re-sealable storage containers, in particular for life vest storage containers on board a passenger aircraft.

According to a first aspect of the invention, a tamper detection system comprises a receptacle having an access opening with a closable lid; a first electrically conductive monitoring pad formed on the closable lid; a second electrically conductive monitoring pad formed on the receptacle; a sealing member formed of electrically non-conductive material and including two patches of electrically conductive adhesive on the bottom side of two opposite edges of the sealing member and at least one electrically conductive element leading between the two patches of electrically conductive adhesives within the electrically non-conductive material, the two patches of electrically conductive adhesive of the sealing member being applied to the first and second electrically conductive monitoring pads, respectively; and a monitoring system electrically coupled to the first and second electrically conductive monitoring pads and configured to measure an electrical parameter associated with the electrically conductive path formed by the first and second electrically conductive monitoring pads and the at least one electrically conductive element within the sealing member.

According to a second aspect of the invention, a method for detecting a tamper event at a re-sealable storage container comprises adhering a sealing member formed of electrically non-conductive material and including two patches of electrically conductive adhesive on the bottom side of two opposite edges of the sealing member and at least one electrically conductive element leading between the two patches of electrically conductive adhesives within the electrically non-conductive material to a first electrically conductive monitoring pad formed on a closable lid of the re-sealable storage container and to a second electrically conductive monitoring pad formed on a receptacle of the re-sealable storage container; electrically coupling a monitoring system to the first and second electrically conductive monitoring pads; measuring an electrical parameter associated with the electrically conductive path formed by the first and second electrically conductive monitoring pads and the at least one electrically conductive element within the sealing member; and outputting, by the monitoring system, a tamper event signal if the measured electrical parameter exceeds a predetermined tamper detection threshold value.

According to a third aspect of the invention, an aircraft, in particular a passenger aircraft, comprises at least one tamper detection system according to the first aspect of the invention. In some embodiments, the aircraft can have a plurality of such tamper detection systems and a plurality of groups of seats, with each of the plurality of tamper detection systems being implemented beneath a respective one of the plurality of seats.

According to a fourth aspect of the invention, a one-way sealing member is used for sealing an access opening of a re-sealable storage container on board of an aircraft, the sealing member comprising electrically non-conductive material having an ultimate tensile strength below a tearing force that can be mustered by a passenger on the aircraft. The sealing member includes two patches of electrically conductive adhesives on the bottom side of two opposite edges of the sealing member, and at least one electrically conductive path leading between the two patches of electrically conductive adhesives within the electrically non-conductive material.

One of the essential ideas of the invention is to reliably detect tampering or manipulation events of re-sealable storage containers so that the opening and re-closing of the storage containers by unauthorized people may be tracked even after the tampering or manipulation event already took place. In order to do so, a one-way sealing member may be placed over two neighboring components of a closable access opening. The one-way sealing member includes an electrically conductive path embedded therein, connecting two opposite side edges of the sealing member which are each placed on electrically conductive contact pads of the two neighboring components of the closable access opening. The placement of the one-way sealing member establishes a low impedance path between the electrically conductive contact pads of the two neighboring components. Gaining access to the access opening requires removing or otherwise disrupting the sealing member, thereby disrupting the low impedance path.

As the sealing member is constructed as a disposable product, the disruption of the low impedance path in the course of the tampering or manipulation event is not reversible, i.e. re-establishing the low impedance path would regularly require placing a new one-way sealing member.

A particular advantage of the solution according to the invention stems from the fact that the disruption of the low impedance path may be detected by measuring electrical parameters associated with the presence (or absence) of the low impedance path, which in turn leads to being able to determine the presence (or absence) of a tampering or manipulation event by electrical measurements. Such measurements may advantageously be automated so that checking on the integrity of access openings of previously sealed re-sealable storage containers may be performed remotely.

In the case of life vest storage containers stowed beneath passenger seats of passenger aircraft, such life vest storage containers may be sealed with one-way sealing members and equipped with an internal measurement system. The internal measurement system of each life vest storage container may continuously, intermittently and/or on-demand monitor the integrity of the low impedance path established by the respective sealing members. Depending on the result of this monitoring, each internal measurement system may report the outcome of the monitoring to a central data processing facility on board of the aircraft, rendering it easier for the cabin crew to locate life vest storage containers which may have been tampered with, without the need to visually inspect the life vest storage containers.

In addition, the solution according to the invention is able to keep track of tampering or manipulation events even if the internal measurement system is temporarily de-energized such as during a stopover at an aircraft. Due to the sealing member being irreversibly damaged in case of a tampering or manipulation event, the impedance change in the electrical path provided by the previously intact sealing member will be detectable once the internal measurement system is being provided with electrical energy again.

Advantageous configurations and refinements will become understood from the further dependent claims and from the description with reference to the figures.

According to some embodiments of the tamper detection system, a life vest may be placed within the receptacle.

According to some embodiments of the tamper detection system, the electrically non-conductive material of the sealing member may be paper, cardboard, polypropylene, polyethylene, cellophane or any other suitably flexible material of relatively low ultimate tensile strength. According to some further embodiments of the tamper distribution system, the at least one electrically conductive element of the sealing member is a metallic wire.

In some embodiments, the monitoring system may be configured to measure the impedance of the electrically conductive path formed by the first and second electrically conductive monitoring pads and the at least one electrically conductive element within the sealing member. In some variants thereof, the monitoring system may be configured to output a tamper event signal if the measured impedance is above a tamper detection threshold value. For example, the monitoring system may be configured to output the tamper event signal via a wireless communication link and/or via a wire-bound data bus. Tamper event signals of multiple tamper detection systems associated with different storage containers may be gathered at a central processing entity so that it may be centrally and remotely monitored which of the storage containers may have been subject to a tamper or manipulation event.

In some embodiments, the monitoring system may be configured to output a tamper event signal if the measured impedance is above a tamper detection threshold value, and the tamper event signal may be routed to a signaling device installed in the vicinity of the storage container. The signaling device may for example be an acoustic signaling device, such as a beeper or signal buzzer, a visual signaling device, such as one or more colored LEDs, a small display or similar lighting devices, or a combination of any of such signaling devices.

According to some embodiments, the signaling device may be implemented in a power supply system of a seat assembly nearby which the tamper detection system is installed. For example, an already existing signaling device of the power supply system of the seat assembly, such as an in-use indicator, may be used to additionally indicate tamper event signals generated by the monitoring system.

According to some further embodiments of the tamper detection system, the monitoring system may be powered by a power supply system of a seat assembly of an aircraft. In such embodiments, the monitoring system may include a first signaling device for outputting an indication of tamper event signals generated by the monitoring system, which signaling device is powered independently from the power supply system of the seat assembly. Additionally, it may be possible in several embodiments to provide a second signaling device, for example as software module on electronic devices for flight crew members. This second signaling device may serve as centralized output for tamper event signals generated by monitoring systems distributed throughout the aircraft.

One of the advantages associated with signaling devices implemented in the vicinity of the storage container is the possibility to develop the tamper detection system on a relatively higher design assurance level (DAL). The DAL category is determined from safety assessment processes and hazard analyses that examine the effects on aircraft, crew and passengers of a failure condition in the system to be categorized. Moreover, it may be possible to have the tamper detection system categorized in a DAL category independently of any neighboring systems, if the indication of tamper event signals is performed within the monitoring system instead of relying on tamper event signals being output to other systems outside the monitoring system.

According to some further embodiments of the tamper detection system, opening the closable lid may cause the sealing member to irreversibly rupture. Such a one-way sealing member may be intentionally ruptured if a passenger needs to access a life vest storage container in case of emergency.

According to some embodiments of the method, the electrically non-conductive material of the sealing member can be paper, cardboard, polypropylene, polyethylene, cellophane or any other suitably flexible material of relatively low ultimate tensile strength.

According to some further embodiments of the method, measuring the electrical parameter may comprise measuring the impedance of the electrically conductive path formed by the first and second electrically conductive monitoring pads and the at least one electrically conductive element within the sealing member. In some instances, the impedance of the electrically conductive path may rise above the predetermined tamper detection threshold value if the closable lid is opened, thereby causing the sealing member to irreversibly rupture.

The above configurations and refinements may be combined with one another as desired where expedient. Further possible embodiments, refinements and implementations of the invention also encompass combinations, which are not explicitly mentioned, of features of the invention described above or below with regard to the exemplary embodiments. In particular, a person skilled in the art will also add individual aspects as improvements or additions to the respective basic form of the present invention.

SUMMARY OF THE DRAWINGS

The present invention will be discussed in more detail below on the basis of the exemplary embodiments shown in the schematic figures. In the figures.

Figure 1:
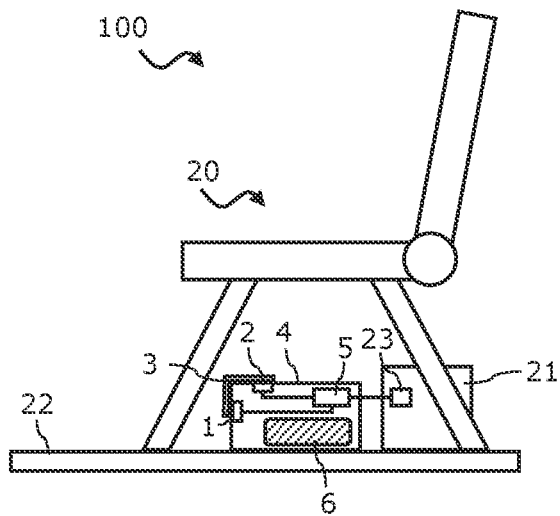
FIG. 1 shows a schematic diagram of a seating assembly in an aircraft having a tamper detection system for life vest storage containers according to one embodiment of the invention.

The appended figures are intended to provide improved understanding of the embodiments of the invention. They illustrate embodiments and serve, in conjunction with the description, for the explanation of principles and concepts of the invention. Other embodiments, and many of the stated advantages, will emerge with regard to the drawings. The elements of the drawings are not necessarily shown true to scale relative to one another. Direction-indicating terminology such as, for instance, "top", "bottom", "left", "right", "above", "below", "horizontal", "vertical", "front", "rear" and similar indications are used only for explanatory purposes and do not serve to restrict the generality to specific configurations as shown in the figures.

In the figures of the drawing, elements, features and components which are identical, functionally identical and of identical action are denoted in each case by the same reference designations unless stated otherwise.

DESCRIPTION OF EXEMPLARY EMBODIMENTS

Vehicle seats in the context of this invention comprise any form of structural component of a vehicle that are intended to seat a passenger for the duration of the journey using the vehicle. In particular, vehicle seats in aircraft can be used personally and at least predominantly exclusively by the aircraft passenger of the aircraft during the flight. Seats or vehicle seats in the context of the invention can be aircraft seats divided into groups of seats, but also loungers, armchairs, beds, suites of first class or business class or similar seating furniture within an aircraft.

Figure 3:
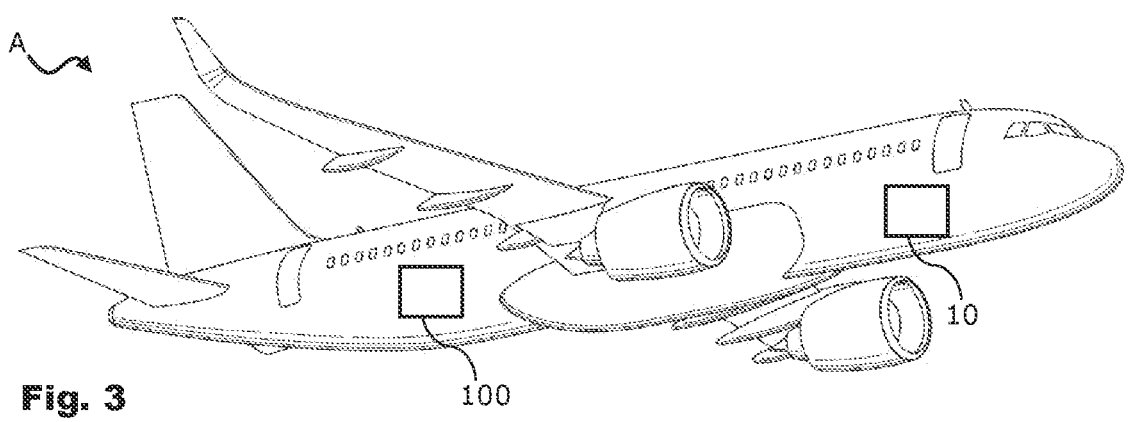
FIG. 3 shows an aircraft having a tamper detection system according to a further embodiment of the invention.

FIG. 1 shows a schematic diagram of a seat assembly 100 on board of an aircraft. The seat assembly 100 may for example comprise a group of seats 20 in a passenger aircraft, such as the aircraft. An illustrated schematically in FIG. 3. Here, each of the different seats 20 in a passenger aircraft can be equipped with a re-sealable storage container 10 underneath the seat, such as, for example, a life vest storage container 10 containing an emergency life vest 6. The aircraft seats 20 of the seat assembly 100 may each be attached to the cabin floor by an attachment rail 22. An in-seat power distribution system 21 may be associated with each seat 20 individually or with a seat assembly 100 as a whole. The in-seat power distribution system 21 may for example have power supply components 23 configured to provide power to electrically powered components of the seat assembly 100 such as for example an on-board media entertainment system, power plugs or seat control elements, not explicitly illustrated in FIG. 1.

Figure 2:
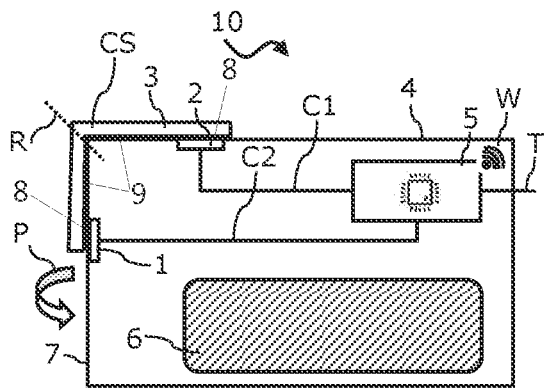
FIG. 2 shows a schematic diagram of a re-sealable storage container with a tamper detection system on board of an aircraft, for example the life vest storage container shown in FIG. 1, according to a further embodiment of the invention.

As illustrated in more detail in conjunction with FIG. 2, the storage container 10 includes a receptacle 4 having an access opening with a closable lid 7. For example, moving the movable elements of the closable lid 7 in a hinging motion P around a hinge at the bottom of the receptacle 4 may cause the access opening to unblock so that access to the interior of the receptacle 4 may be possible for a passenger. Within the receptacle 4 a life vest 6 may be stowed.

While the tamper detection system is described in conjunction with a life vest storage container 10, it may equally be possible for other storage containers on board of an aircraft to be equipped with a tamper detection system having one or more features as disclosed herein.

A first electrically conductive monitoring pad 1 is formed on the closable lid 7, while a second electrically conductive monitoring pad 2 is formed on the receptacle 4. The electrically conductive monitoring pads 1 and 2 are each electrically coupled via respective coupling lines C1 and C2 to a monitoring system 5. The monitoring system 5 may for example include a microcontroller, an ASIC or an FPGA.

A sealing member 3 is formed of electrically non-conductive material, for example paper or a similar pliable material of low ultimate tensile strength such as cardboard, polypropylene, polyethylene, cellophane or any other suitably flexible material. The sealing member 3 is designed to rupture irreversibly at a rupture line R if the closable lid 7 is opened. In particular, the ultimate tensile strength may be below a tearing force that can be mustered by a passenger on the aircraft so that the passenger may easily gain access to the interior of the life vest storage container 10 in case of an emergency. A maximum tearing force that can be mustered by a passenger is 505.2 Newtons which is reported as the average maximum force for a left hand in Bretz et al, "Force Measurements Of Hand and Fingers", Tables 1 and 2 at page 63, Biomechanica Hungarica III. Évfolyam, 1. Szám (April 2010).

On two opposite edges of the sealing member 3, electrically conductive adhesive is formed in patches 8 on the bottom side of the sealing member 3. The patches 8 are located in positions where they may be in galvanic contact to respective ones of the electrically conductive monitoring pads 1 and 2. The sealing member 3 further includes at least one electrically conductive element 9 leading between the two patches 8 of electrically conductive adhesives within the electrically non-conductive material, for example one or more thin metallic wires or layers of a metallic material coated on the electrically non-conductive material. The electrically conductive element(s) provide(s) for an electrically conductive path C1, C2, CS formed by the first and second electrically conductive monitoring pads 1 and 2 and the at least one electrically conductive element within the sealing member 3.

The monitoring system 5 may be implemented to measure an electrical parameter associated with this electrically conductive path C1, C2, CS. If the sealing member 3 is still intact, the impedance of this electrically conductive path C1, C2, CS will be relatively low. On the other hand, if the sealing member 3 is damaged or ruptured due to a tampering or manipulation event, the electrically conductive element within the sealing member 3 will be damaged or cut off so that the impedance of the electrically conductive path C1, C2, CS will be relatively high.

When the measured electrical parameter, such as the electrical impedance, is above a tamper detection threshold value, the monitoring system 5 may output a tamper event signal if the measured impedance is above a tamper detection threshold value. This tamper event signal may for example be output via a wireless communication link W and/or via a wire-bound data bus T. In case of the wire-bound data bus T, the tamper event signals of multiple monitoring systems 5 may be collected by the network of power supply systems 21 for seat assemblies 100 and routed to a central processing facility, such as a cabin crew information panel on board of an aircraft. The power supply systems 21 of seat assemblies 100 of an aircraft A may also provide power to the monitoring systems 5 of the storage containers 10.

The monitoring system 5 may route the tamper event signal to a signaling device installed in the vicinity of the receptacle 4 of the storage container 10. Such a signaling device may for example be an acoustic signaling device, such as a beeper or signal buzzer, a visual signaling device, such as one or more colored LEDs, a small display or similar lighting devices, or a combination of any of such signaling devices. The signaling device may be implemented in the power supply system 12 of a seat assembly 100 nearby which the tamper detection system is installed. For example, an already existing signaling device, such as an in-use indicator of the power supply system 12, may be used to additionally indicate tamper event signals generated by the monitoring system 5.

The monitoring system 5 may be configured to continuously or intermittently measure the electrical parameters associated with the electrically conductive path C1, C2, CS. Once a tamper event has been detected, the detection event may be stored internally in the monitoring system 5 until the monitoring system 5 is externally polled to report on any detected tampering event. Such poll may, in case of the life vest storage containers 10, be initiated by the cabin crew during the flight preparations. For example, electronic devices for flight crew members such as tablets or smartphones may have software modules installed that work as signaling devices for indicating tamper event signals output by a monitoring system 5. Such electronic devices may then serve as centralized output for tamper event signals generated by monitoring systems 5 distributed throughout the aircraft A.

Figure 4:
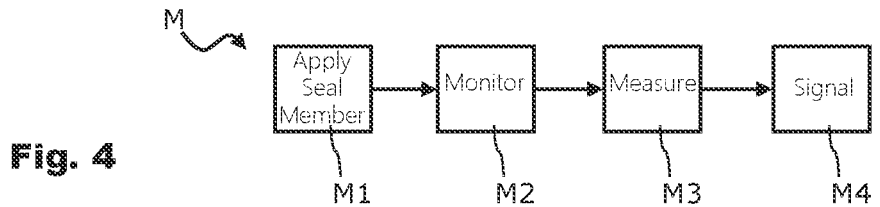
FIG. 4 shows a flowchart of a method for detecting a tamper event at a re-sealable storage container, for example the re-sealable container as shown in FIG. 1, according to a further embodiment of the invention.

FIG. 4 shows a flowchart of the method steps of a method M for detecting a tamper event at a re-sealable storage container, for example the re-sealable storage container 4 as indicated and explained in conjunction with FIGS. 1 and 2. The method M may advantageously be carried out on board of an aircraft, such as the aircraft A as exemplarily depicted in FIG. 3. Specifically, the method M may be used to detect tampering or manipulation events at life vest storage containers 4 underneath passenger seats 20 of a passenger aircraft A.

In a first step M1, a sealing member 3 formed of electrically non-conductive material, such as for example paper or any other pliable material of relatively low ultimate tensile strength, is adhered to a first electrically conductive monitoring pad 1 formed on a closable lid 7 of a re-sealable storage container 10 and to a second electrically conductive monitoring pad 2 formed on a receptacle 4 of the re-sealable storage container 10. The sealing member 3 includes two patches of electrically conductive adhesive on the bottom side of two opposite edges, e.g. legs, of the sealing member 3 and at least one electrically conductive element—for example, one or more metallic wires—leading between the two patches of electrically conductive adhesives within the electrically non-conductive material.

In a second step M2, a monitoring system 5 is electrically coupled to the first and second electrically conductive monitoring pads 1 and 2. The monitoring system 5 may then in a third step M3, measure an electrical parameter, such as for example the electrical impedance, associated with the electrically conductive path C1, C2, CS formed by the first and second electrically conductive monitoring pads 1 and 2 and the at least one electrically conductive element within the sealing member 3.

If the measured electrical parameter exceeds a predetermined tamper detection threshold value, for example when the closable lid 7 has been opened, thereby causing the sealing member 3 to irreversibly rupture, the monitoring system 5 outputs a tamper event signal in a fourth step M4.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and exemplary embodiments. Many other examples will be immediately and directly clear to a person skilled in the art on the basis of his technical knowledge in view of the description above.

The exemplary embodiments were chosen and described in order to be able to represent the principles on which the invention is based and their possible uses in practice in the best possible manner. As a result, experts can optimally modify and use the invention and its various exemplary embodiments for the intended purpose. In the claims and the description, the terms "containing" and "having" are used as neutral concepts for the corresponding term "comprising". Furthermore, a use of the terms "a", "an" and "one" is not intended to fundamentally exclude a plurality of features and components described in such a way.

The invention claimed is:

1. A tamper detection system for a life vest storage container on board a passenger aircraft, the tamper detection system comprising:
   a receptacle having an access opening configured to store a life vest and to be placed proximate a passenger seat of the passenger aircraft;
   a closable lid attached to the receptacle and having a closed position in which the access opening of the receptacle is closed by the closable lid and an open position in which the access opening is open;
   a first electrically conductive monitoring pad formed on the closable lid;

a second electrically conductive monitoring pad formed on the receptacle;

a sealing member formed of an electrically non-conductive material and including two patches of electrically conductive adhesive each on a respective bottom side of one of two opposite sections of the sealing member and at least one electrically conductive element leading between the two patches of electrically conductive adhesives within the electrically non-conductive material, a first of the two patches of electrically conductive adhesive of the sealing member applied to the first electrically conductive monitoring pad and a second of the two patches applied to the second electrically conductive monitoring pad; and a monitoring system electrically coupled to the first electrically conductive monitoring pad and to the second electrically conductive monitoring pad, and configured to measure an electrical parameter associated with an electrically conductive path formed by the first and second electrically conductive monitoring pads and the at least one electrically conductive element within the sealing member, wherein the electrically non-conductive material has an ultimate tensile strength below a predetermined tearing force which corresponds to a maximum force that can be mustered by a passenger on the aircraft to tear the electrically non-conductive material, and wherein the maximum force is 505.2 Newtons.

2. The tamper detection system according to claim 1, wherein the electrically non-conductive material of the sealing member is at least one of paper, cardboard, polypropylene, polyethylene or cellophane.

3. The tamper detection system according to claim 1, wherein the at least one electrically conductive element of the sealing member is a metallic wire.

4. The tamper detection system according to claim 1, wherein the monitoring system is configured to measure an impedance of the electrically conductive path formed by the first and second electrically conductive monitoring pads and the at least one electrically conductive element within the sealing member.

5. The tamper detection system according to claim 4, wherein the monitoring system is configured to output a tamper event signal to a signaling device proximate the receptacle, if the impedance is above a tamper detection threshold value.

6. The tamper detection system according to claim 5, wherein the monitoring system is configured to output the tamper event signal via a wireless communication link and/or via a wire-bound data bus.

7. The tamper detection system according to claim 1, wherein the monitoring system is configured to be powered by a power supply system of a seat assembly of the passenger seat.

8. The tamper detection system according to claim 1, wherein the sealing member is configured to irreversibly rupture in response to opening the closable lid.

9. An aircraft having at least one tamper detection system according to claim 1.

10. A method for detecting a tamper event at a storage container on board of a passenger aircraft, wherein the storage container is configured to store a passenger life vest and is associated with a passenger seat of the aircraft, the method comprising:

adhering a sealing member formed of electrically non-conductive material and including a first patch of electrically conductive adhesive on a bottom side of a first section of the sealing member, a second patch of electrically conductive adhesive on a bottom side of a second section of the sealing member, and at least one electrically conductive element leading between the first and second patches of the electrically conductive adhesives within the electrically non-conductive material to form a conductive path between a first electrically conductive monitoring pad on a closable lid of the storage container and a second electrically conductive monitoring pad on a receptacle of the storage container;

electrically coupling a monitoring system to the first electrically conductive monitoring pad and to the second electrically conductive monitoring pad;

measuring an electrical parameter associated with an electrically conductive path formed by the first and second electrically conductive monitoring pads and the at least one electrically conductive element within the sealing member; and outputting, by the monitoring system, a tamper event signal in response to the measured electrical parameter exceeding a predetermined tamper detection threshold value, wherein the electrically non-conductive material has an ultimate tensile strength below a tearing force determined to be a maximum force that can be mustered by a passenger on the aircraft to tear the electrically non-conductive material, and wherein the maximum force is 505.2 Newtons.

11. The method according to claim 10, wherein the electrically non-conductive material of the sealing member is formed of at least one of paper, cardboard, polypropylene, polyethylene or cellophane.

12. The method according to claim 10, wherein the step of measuring the electrical parameter comprises measuring an impedance of the electrically conductive path formed by the first and second electrically conductive monitoring pads and the at least one electrically conductive element within the sealing member.

13. The method according to claim 12, wherein the impedance of the electrically conductive path rises above the predetermined tamper detection threshold value if the closable lid is opened, thereby causing the sealing member to irreversibly rupture.

14. A one-way sealing member configured to seal an access opening of a re-sealable storage container proximate a passenger seat on a passenger aircraft, the one-way sealing member comprising:

an electrically non-conductive material having an ultimate tensile strength below a tearing force that can be mustered by a passenger on the aircraft to tear the electrically non-conductive material;

two patches of electrically conductive adhesive on a bottom side of two opposite e of the sealing member; and at least one electrically conductive path leading between the two patches of electrically conductive adhesives, wherein the at least one electrically conductive path is within the electrically non-conductive material, and wherein the tearing force is 505.2 Newtons.

* * * * *